US011828306B2

(12) United States Patent
Ethier et al.

(10) Patent No.: US 11,828,306 B2
(45) Date of Patent: Nov. 28, 2023

(54) METHOD AND A SYSTEM FOR POSITION MEASUREMENT OF A PISTON ROD OF A HYDRAULIC CYLINDER

(71) Applicant: INDUSTRIES MAILHOT INC., St-Jacques (CA)

(72) Inventors: Jean-Michel Ethier, Montréal (CA); Daniel Landry, Québec (CA); Martin Dubé, Québec (CA)

(73) Assignee: INDUSTRIES MAILHOT INC., St-Jacques (CA)

( * ) Notice: Subject to any disclaimer, the term of this patent is extended or adjusted under 35 U.S.C. 154(b) by 407 days.

(21) Appl. No.: 17/302,333

(22) Filed: Apr. 30, 2021

(65) Prior Publication Data
US 2022/0349428 A1    Nov. 3, 2022

(51) Int. Cl.
*H03M 1/22* (2006.01)
*F15B 15/28* (2006.01)
*G06T 7/70* (2017.01)
*G06K 19/06* (2006.01)
*F15B 15/14* (2006.01)
*G06V 10/60* (2022.01)

(52) U.S. Cl.
CPC ...... *F15B 15/2846* (2013.01); *F15B 15/1457* (2013.01); *G06K 19/06084* (2013.01); *G06T 7/70* (2017.01); *G06V 10/60* (2022.01); *G06T 2207/10056* (2013.01)

(58) Field of Classification Search
CPC .... F15B 15/2846; F15B 15/1457; G06T 7/70; G06T 7/20; G06V 10/60; G06K 19/06084
See application file for complete search history.

(56) References Cited

U.S. PATENT DOCUMENTS

| 7,047,865 B2 | 5/2006 | Neumann |
| 7,116,097 B2 | 10/2006 | Revankar et al. |
| 7,634,155 B2 | 12/2009 | Pawelski et al. |
| 8,240,240 B2 | 8/2012 | Fitzkee et al. |
| 10,094,397 B2 | 10/2018 | Schwab et al. |
| 10,557,209 B2 | 2/2020 | Trivigno et al. |
| 2013/0319223 A1 | 12/2013 | Bina et al. |

FOREIGN PATENT DOCUMENTS

| AU | 2003202877 A1 | 7/2003 |
| DE | 2855681 A1 | 6/1980 |
| DE | 9209980 U1 | 9/1992 |
| DE | 29613725 U1 | 10/1996 |
| DE | 10014194 A1 | 1/2001 |

(Continued)

*Primary Examiner* — Joseph J Lauture
(74) *Attorney, Agent, or Firm* — Lavery, de Billy, L.L.P.; Gwendoline Bruneau (57) ABSTRACT

A method for determining the position of a first part moving in relation to a second part in a system, comprising forming a code on a surface of the first part or the second part, yielding an encoded surface; detecting the code on the encoded surface; decoding the code; and determining the position of the moving part from the decoding of the code; the code comprises microstructures at precisely selected positions on the surface of the encoded part; detecting the code comprises scanning the encoded surface with a sensor in conditions selected in relation to the code formed and to the encoded surface to precisely read the code on the encoded surface.

20 Claims, 9 Drawing Sheets

(56) References Cited

FOREIGN PATENT DOCUMENTS

| | | | |
|---|---|---|---|
| DE | 20200800494 U1 | 9/2009 | |
| DE | 102015122479 A1 | 7/2016 | |
| DE | 102015104201 A1 | 9/2016 | |
| DE | 102015121571 A1 | 3/2017 | |
| DE | 102016117800 A1 | 3/2018 | |
| DE | 102017118509 A1 | 2/2019 | |
| EP | 3030794 B1 | 11/2020 | |
| GB | 2574064 A * | 11/2019 | ............ B25J 19/023 |
| IT | UA20164551 A1 | 12/2017 | |
| WO | 2003023413 A1 | 3/2003 | |
| WO | 2009053812 A2 | 4/2009 | |
| WO | 2012112989 A1 | 8/2012 | |
| WO | 2016097698 A1 | 12/2015 | |

\* cited by examiner

METHOD AND A SYSTEM FOR POSITION MEASUREMENT OF A PISTON ROD OF A HYDRAULIC CYLINDER

FIELD OF THE INVENTION

The present invention relates to a method for determining a position of a first part moving in relation to a second part in a system. More specifically, the present invention is concerned with a method for measurement of the position of the moving part in a system.

BACKGROUND OF THE INVENTION

A hydraulic cylinder generally comprises a cylindrical barrel, closed on a first side thereof by a cap and at a second side thereof by a cylinder head where the piston rod comes out of the barrel. When operating, the piston rod reciprocates in the barrel, in a back and forth movement.

In a number of hydraulic system applications, such as for instance when monitoring the drilling depth of a hydraulic drilling device in mining operations, it is required to accurately know the position of the piston rod of the hydraulic cylinder. A controller may be used to control the cylinder, the controller evaluating an error between a setpoint and a current position value of the piston rod and modulating commanded variables sent to a proportional valve in a closed loop system.

Existing absolute position measurement methods and systems may be categorized into internal and external, as defined with respect to the cylinder. Internal methods and systems use magnetostrictive and hall-effect based detectors mounted to the cylinder, which typically requires costly machining operations. Moreover, such methods and systems are subjected to minimum stroke length and minimal retracted length increase limitations. External methods and systems use detectors such as cable potentiometers, laser or magnetic based detectors, or other indirect measurement detectors such as angular encoders mounted on pivot joints of the cylinder.

Position detectors may also be used to measure absolute or relative position. Relative position detectors require knowledge of a first position of the actuator and a measure of a variation of this first position; a relative position detector can provide the absolute position as long as the first state is not lost or corrupted, for example due to power outage, and errors in the measurement of the variation of the first position accumulate over time. In contrast, absolute position detectors directly provide a current position in absence of a previously known position; they are generally used in the field of hydraulic cylinders.

There is still a need in the art for a method and a system for measurement of the absolute position of the piston rod of a hydraulic cylinder.

SUMMARY OF THE DISCLOSURE

More specifically, in accordance with the present disclosure, there is provided a method for determining a position of a first part moving in relation to a second part in a system, comprising forming a code on a surface of one of: i) the first part and ii) the second part; yielding an encoded surface; detecting the code on the encoded surface; decoding the code; and determining the position of the moving part from the decoding of the code; wherein forming the code comprises forming microstructures at precisely selected positions on the surface of the encoded part; and detecting the code comprises scanning the encoded surface with a sensor.

There is further provided a method for determining a position of a piston rod reciprocating within a barrel of a linear actuator, comprising forming a code on a surface of the piston rod; yielding an encoded surface; detecting the code on the encoded surface; decoding the code; and determining the position of the piston rod from the decoding of the code; wherein forming the code comprises forming microstructures at precisely selected positions on the surface of the piston rod; detecting the code comprises selecting an optical sensor and acquiring images of the surface of the piston rod using the sensor; decoding comprises detecting microstructures on the images and one of: i) determining a first position of the piston rod from the detecting of the microstructures on the images; ii) determining a first position of the piston rod from the detecting of the microstructures on the images and applying a first offset to the first position to obtain a second position from the detecting of the microstructures on the images; and ii) determining a first position of the piston rod from the detecting of the microstructures on the images; applying a first offset to the first position to obtain a second position from the detecting of the microstructures on the images; and applying a second offset to the second position to obtain a third position from the detecting of the microstructures on the images; the second offset being determined when the piston is in a fully retracted position.

Other objects, advantages and features of the present disclosure will become more apparent upon reading of the following non-restrictive description of specific embodiments thereof, given by way of example only with reference to the accompanying drawings.

DESCRIPTION OF EMBODIMENTS OF THE INVENTION

The invention will be described herein, although it is not limited to this example, in a case of a linear actuator, such as a hydraulic cylinder comprising a piston rod (P) reciprocating within a barrel (B).

Figure 1:
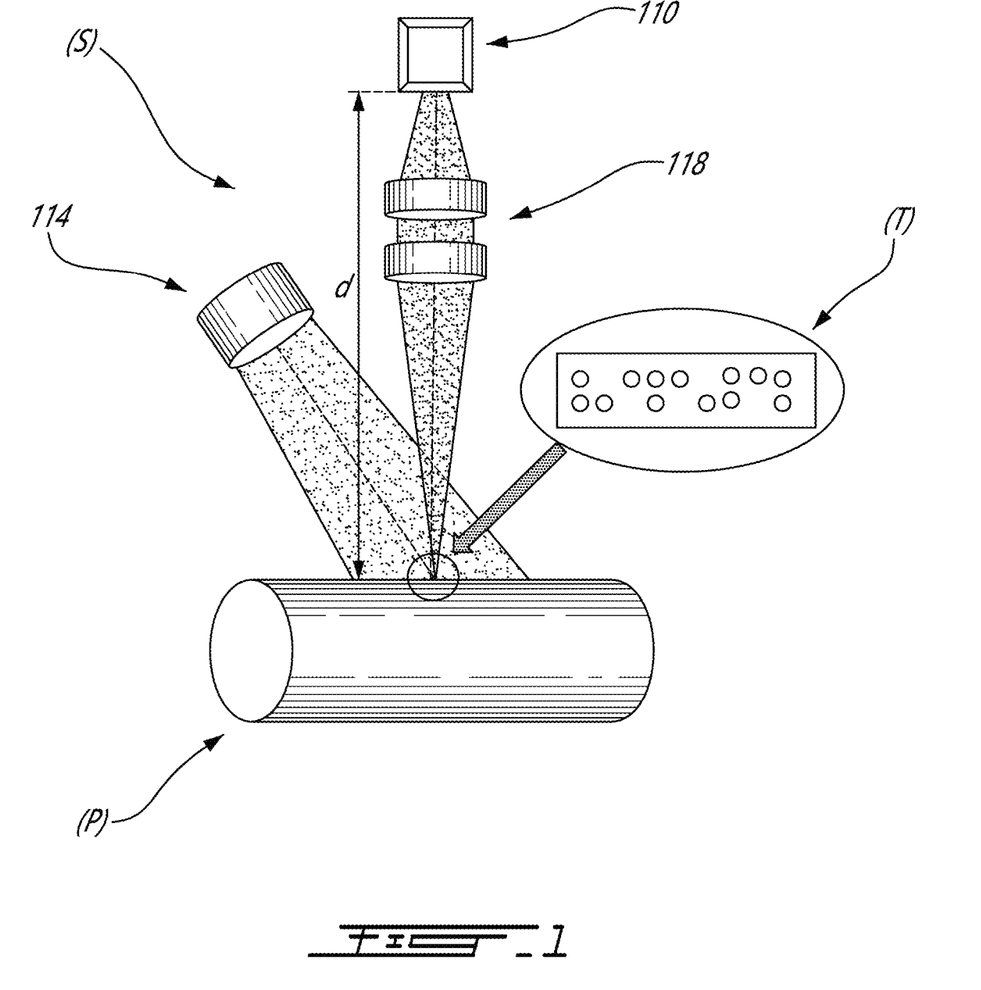
FIG. 1 is a schematic view of a system according to an embodiment of an aspect of the present disclosure.
Figure 2:
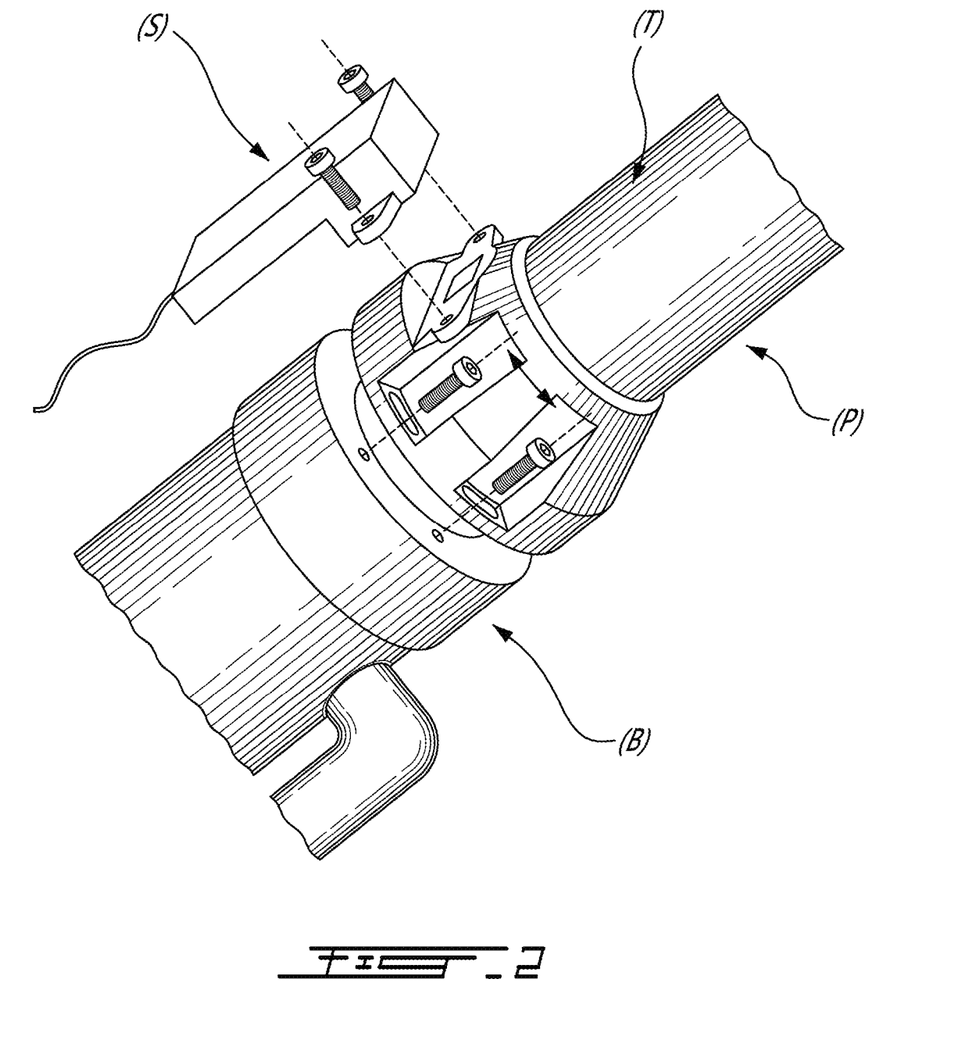
FIG. 2 is a schematic view of a system according to an embodiment of an aspect of the present disclosure.

FIGS. 1 and 2 show a sensor (S) positioned in relation to a piston rod (P) of a linear actuator such as a hydraulic cylinder according to an embodiment of an aspect of the present disclosure.

The sensor comprises a camera 110, illuminating optics 114 and collecting optics 118. The sensor observes a code (T) marked on the piston rod (P).

The camera 110 comprises an internal light detector, for example a CMOS or CCD, and an internal electronic circuit used for digitalization of signals received by the detector. The camera is positioned at an adjustable distance d from the piston rod (P). The distance d is selected in combination with the optical components 114 and 118, typically in the range between about 5 mm and about 10 cm, to provide adjustment to the focal position and for compactness of the sensor (S). The camera 110 is selected with a combination of resolution and magnification so that each individual element of the code (T) covers at least the area of a 3×3 pixel array of the camera detector. In experiments as further described hereinbelow, with a magnification of 1×, these conditions yielded a pixel size of 4 microns. There are no numerical requirements with regards to contrast. It was found that an image consisting of a direct specular reflection, i.e. incident light being reflected in a single outgoing direction, provided good contrast and a very short integration time, therefore allowing increasing the imaging rate, i.e. the number of images acquired per second, and accurately measuring position of a fast-moving rod with a linear speed of at least 500 mm/s.

The illuminating optics 114 comprise a light source and lenses selected for condensing and focusing light emitted by the light source on the surface of the rod (P) in such a way that that the surface of the rod is uniformly lit across the area observed by the camera. Light sources from different regions of the visible spectrum may be selected, such as monochromatic lighting, for example a red LED, or multispectral lighting comprising a number of monochromatic lights. Light from other regions of the electromagnetic spectrum may also be selected, for example ultraviolet (UV). Polarized light may also be selected in order to highlight the signal from the code (T) while being less sensitive to residues, artefacts, and oil films on the surface of rod (P). In experiments as further described hereinbelow, a white LED was selected. Light sources such halogen lights, episcopic lighting and ring lighting around the camera objective may be selected for example.

The collecting optics 118 comprise lenses, such as achromatic lenses for example, selected to collect the light reflected on the rod surface and direct it into the camera 110. The equivalent numerical aperture, also known as the f-ratio, is selected as at most half of the size of the individual elements of the code (T) observed by the sensor (S). The FOV is optimised in relation to the lens, according to factors including the size of the individual elements of the code (T), the amount of code required to be within view for subsequent decoding, the magnification factor of the collecting optics, the size of the light detector of the camera, measured in number of pixels, for example 5 MP, 10 MP, 50 MP, and issues such as how much redundant code should be visible to the sensor (S) as will be discussed hereinbelow. The FOV is thus optimised, typically ranging from less than about 1 square $mm^2$ to several hundreds $mm^2$. The collecting optics are selected to provide enough depth of field to ensure maximum image clarity on a sufficient portion of the FOV, typically at least the half the FOV in such a way that a central portion of the FOV is at focus since the edges of the FOV may be out of focus due to the curvature of the rod (P). For example, in experiments as further described hereinbelow, a commercially available cemented lens assembly called a Steinheil triplet providing a FOV of about 4 square mm was selected. Telecentric lenses may be selected for enhanced depth of field but at the expense of compactness of the collecting optics.

The orientation of the collecting optics and camera may be mechanically adjusted, allowing the sensor (S) to scan the surface of the rod by the sensor (S) and its capture of a number of images stitched together to create a lager composite image, thereby mitigating a limited field of view.

According to an embodiment of an aspect of the present disclosure, the sensor (S) is positioned in relation to the rod (P) so as to observe a code (T) marked on the rod (P), as schematized in FIG. 2.

The permanent code (T) comprises 3D geometrical microstructures formed on the surface of the rod (P), along the longitudinal and circumferential axes of the rod. The microstructures may be localized and separate from one another, such as microcavities for example, or may be continuous, such as linear grooves for example.

Figure 3A:
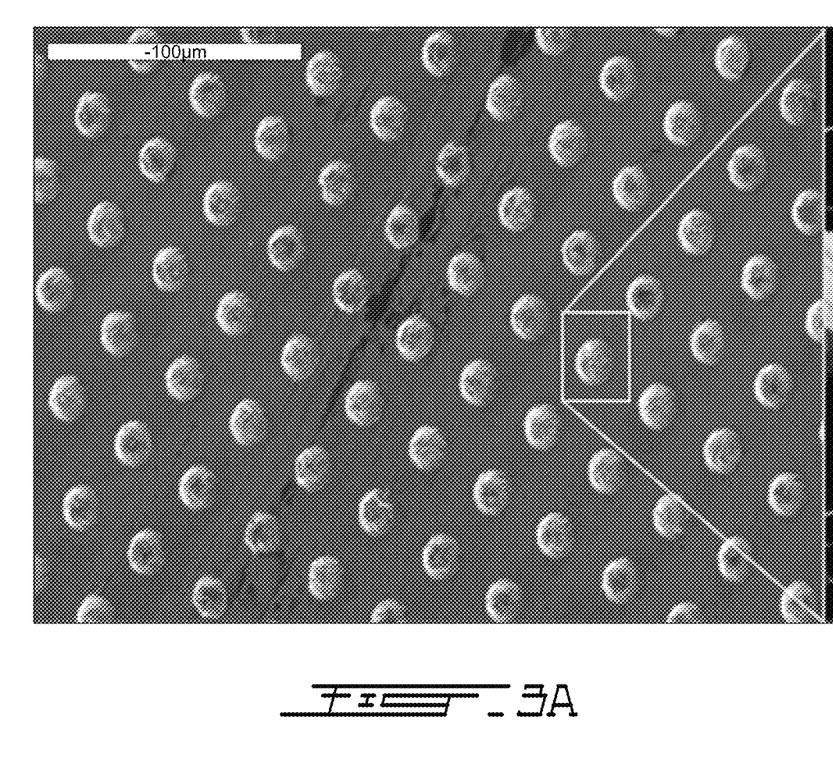
FIG. 3A shows an image of laser textured cavities according to an embodiment of an aspect of the present disclosure.
Figure 3B:
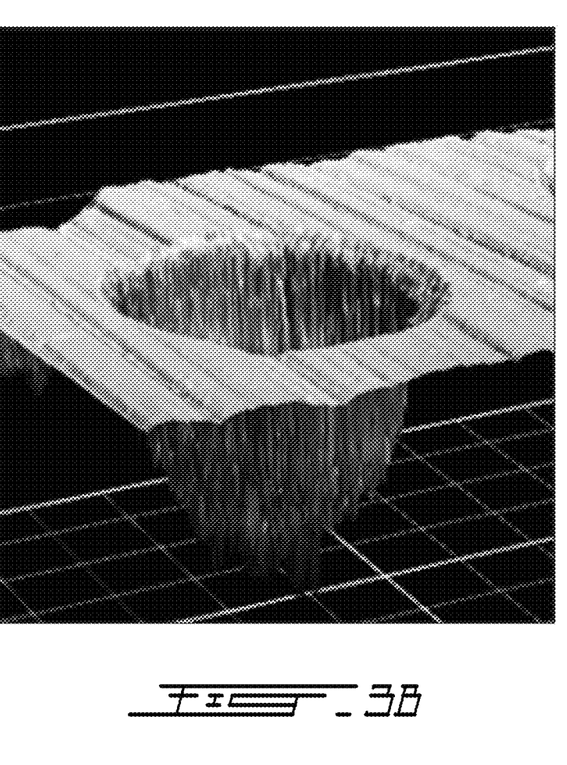
FIG. 3B shows a magnified 3D image of a single cavity obtained by confocal laser microscopy according to an embodiment of an aspect of the present disclosure.
Figure 4:
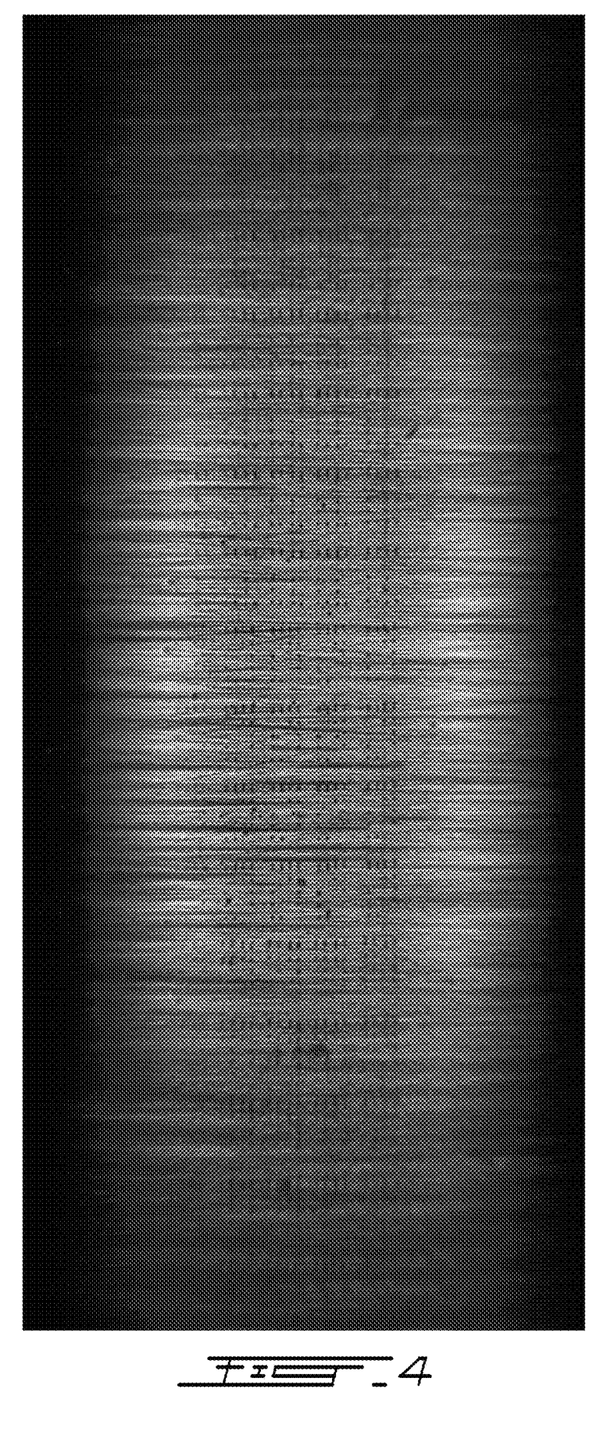
FIG. 4 shows the encoded surface of a cylinder rod according to an embodiment of an aspect of the present disclosure.
Figure 5:
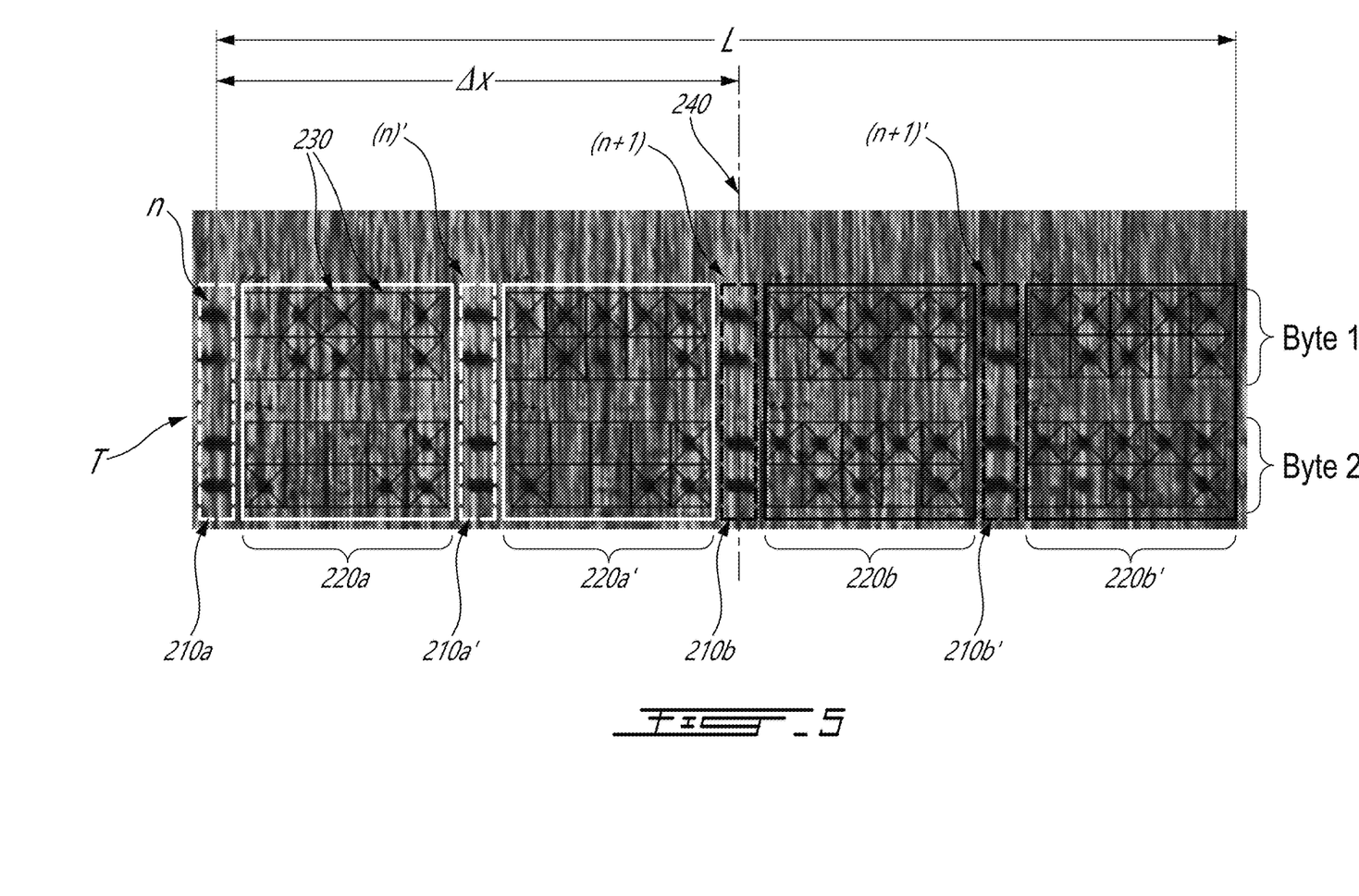
FIG. 5 shows details of encoding of a cylinder rod according to an embodiment of an aspect of the present disclosure.

The microstructures discussed herein for illustration purpose are repeatedly spaced circular cavities ordered in a selected pattern as shown in FIGS. 3-5 for example. The cavities may be selectively formed on the rod for example by ablating matter from the surface using ultra-short laser pulses, the period of the pulses being typically in the picosecond or femtosecond range. Such laser texturing being typically athermal, the surface properties of the rod are not altered by residual heat from the laser, and precise and clean 3D microstructures are formed on the rod with very little debris or artefacts around the microstructures. The radial distance between the laser emitting tool head and the surface of the rod is continuously adjusted during ablation so as to compensate for bending of the rod typically supported at both ends on the laser system, for formation of cavities of a selected shape and size, for example of a uniform and constant shape, and repeatable encoding from one rod to another.

The cavities encode information in a geometric binary representation of a sequence of numbers, a cavity representing a "1", and the absence of a cavity being a "0".

The diameter of the cavities is selected in the range between about 5 and about 500 microns, depending on code needed per surface area to encode the position of the rod at the target precision of a given application. Cavities of larger diameters may be easier to detect, but may lead to sealing issues as fluid transported inside the cavities may leak outside the cylinder; cavities of a reduced diameter may be undetectable against the surface roughness of the rod.

The depth of the cavities is selected to be at most the thickness of the surface coating of the rod in the present case of a hydraulic cylinder, which may be exposed to corrosive conditions, typically in the range between about 1 and about 200 microns and to provide contrast against the roughness of the rod in the illuminated area.

In experiments as further described hereinbelow for example, microcavities of a diameter of about 30 microns and a depth of about 4 microns were formed on rods of a diameter varying between 1 and 3 inches. FIG. 3A shows a set of laser textured cavities on a cylinder rod; the magnified 3D image obtained via confocal laser microscopy in FIG. 3B shows a single cavity contrasting from the surface roughness of the rod.

The linear code thus formed over the length L of the rod is used as a positioning code in the way of a ruler, the rod being illuminated by the light source 114, the collecting optics 118 detect the pattern encoded on the surface of the piston rod (P) as shown for example in FIG. 4, and return images to the camera 110, as discussed hereinbelow. FIG. 4 shows the positioning code (T) in the field of view of the camera.

The spatial positioning of the code along the rod is selected according to target applications. The rod may be partially encoded, or the code may be formed on a side of the rod selected for avoiding obstruction between the sensor and other adjacent machinery for instance. A single or both ends of the rod may be encoded for determining when the cylinder has performed a full extension or retraction for instance.

The spatial positioning of the microstructures may be used as a degree of freedom to select the target accuracy of the position of the rod and/or depending on encoding capabilities of the ablation laser system for example. Thus for example, 12 bits of code may be marked on a single longitudinal line of cavities on the rod; or as 3×4 clusters for redundancy, i.e. robustness, or increased information density, i.e. minimised uncertainty, as will be discussed hereinbelow.

The code (T) exemplified in FIG. 5 comprises delimiting elements 210a/210a'/210b/210b' and information elements 220a/220a'/220b/220b', where (') elements are redundancies included within the code. A delimiting element comprises two adjacent cavities with no gap therebetween. An information element comprises a first set of ten cavity positions 230 and a second set of ten cavity positions.

Each cavity position represents a zone within the code where a cavity may be present, the presence of a cavity in a given position translating into "1" and absence of a cavity in a given position translating into "0". Each cavity position thus forms a bit of binary information, and the ten cavity positions of each one of the first and the second sets form ten bits of binary information, i.e. a byte, in a predetermined geometrical arrangement. The two sets of ten cavity positions, i.e. the two bytes forming the information element, represent a unique integer in a sequence of encoded absolute positions. This unique integer points to a unique absolute position within a sequence of absolute positions marked on the rod.

Two distinct consecutive information elements 220a and 220b of two distinct consecutive encoded positions within the field of view of the camera are used to identify a delimiting element 210b separating them. Alternatively, a single information element, i.e. one pair of bytes, may be used. In any case, additional information may be used as redundancies, under the form of duplicates 210a/210a', 220a/220a', and 210b/210b', 220b/220b', to improve robustness of the subsequent decoding method. FIG. 5 for example shows consecutive positions n and (n+1) on the rod, and their respective duplicates (n)' and (n+1)' used as encoded redundancy.

During the marking of the code (T) on the rod by laser ablation discussed hereinabove, the motion of the laser tool head is precisely controlled, for example by using an electric servo-actuator, in such a way as to precisely locate each cavity as a reference for the absolute position of each information element and each delimiting element, within the accuracy tolerance of the laser tool head motion system. A table is constructed where the absolute position of each information element is associated with a unique integer.

The sensor (S) is positioned relative to the barrel (B) and the cylinder rod (P) so that the rod (P) lies directly under the sensor. The distance between the camera 110 and the piston rod (P) d=0 represents direct contact. In the example of FIG. 1, an adjustable LED lighting element 114 is used to illuminate the surface of the rod (P), and the position of the lens assembly 118 is adjusted radially to bring the surface of the rod (P) into focus of the camera 110.

In the specific example of the hydraulic cylinder as described herein, the sensor (S) scans the surface of the rod (P) as the rod (P) is in linear motion relative to the barrel (B, under illumination). The camera captures images of the code visible within the field of view; the captured images into the pixel array of the camera detector are cropped to exclude non-encoded area; additional pre-processing such as denoising for example may be performed on the cropped image before analysis.

According to an embodiment of an aspect of the present disclosure, the image analysis method comprises searching for delimiting elements in the field of view of the camera and evaluating the position values respectively associated with each information elements adjacent to respective detected delimiting elements to obtain corresponding coarse positions of the rod. The coarse positions are then refined by evaluating the positions of transition lines within the pixel array of the camera and by compensating for equivalent offsets. Final offsets corresponding to position values determined when the piston rod of the cylinder is fully retracted are applied, as will be described hereinbelow.

The accuracy of the obtained absolute positions of the rod is mainly dependent on the tolerance of the positioning of the cavities during encoding and on the width of the pixels in the camera detector, for example a total accuracy of about 10 microns.

The position measurement is independent of the length of the rod provided the accuracy of the encoding step is independent of the size of the encoded surface.

The method as described hereinabove in relation to a hydraulic cylinder thus comprises a selection of steps returning the absolute positions of the rod along its length.

Figure 7:
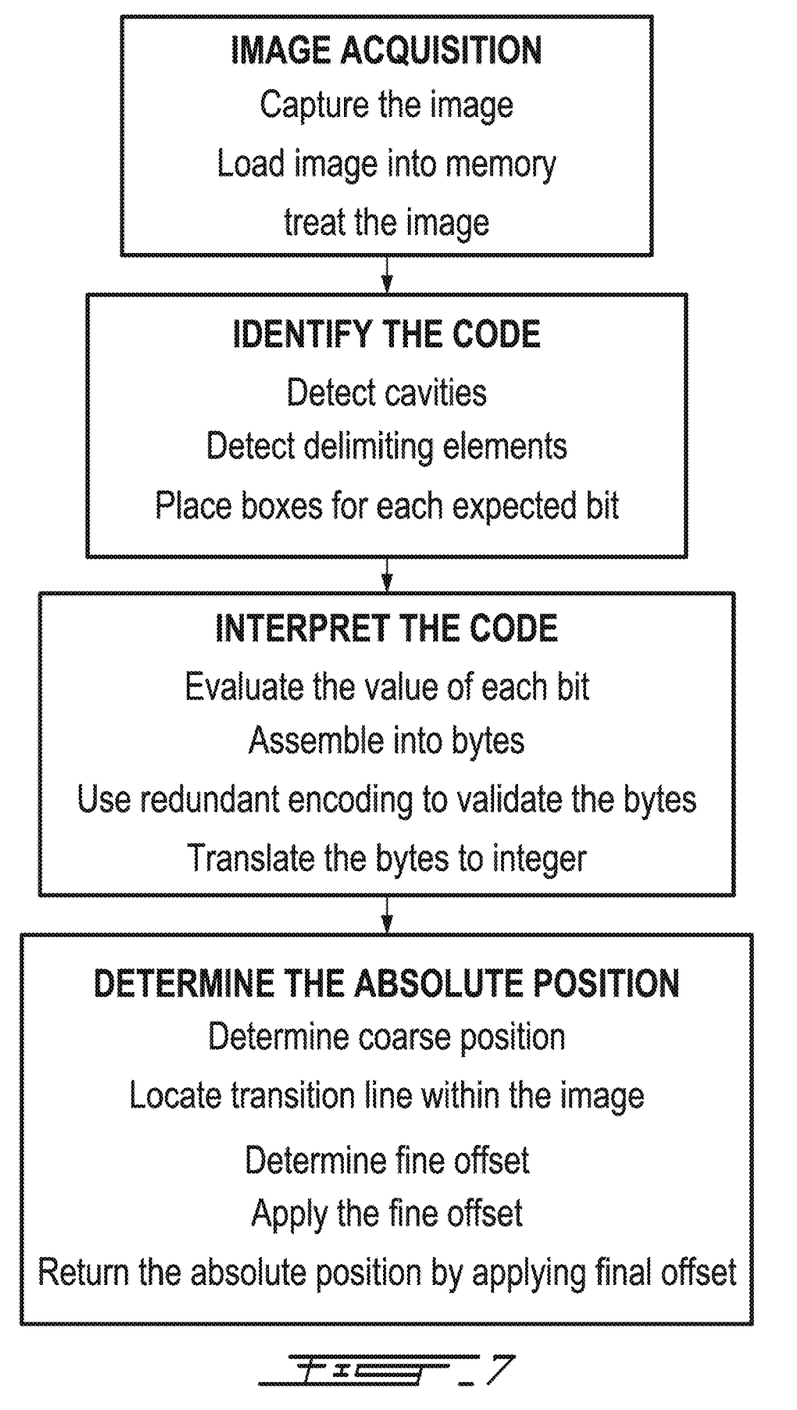
FIG. 7 is a flowchart of a method according to an embodiment of an aspect of the present disclosure.

As summarized in FIG. 7, the method comprises acquisition of images of the surface of the rod, detecting cavities and delimiting elements, decoding adjacent information elements to determine coarse positions and applying offsets to determine exact absolute positions. More specifically, in the optical embodiment of the method as discussed herein in relation to the figures, the method comprises locating cavities in the images by summing the brightness values of each row of pixels, the cavities being less bright than the remaining of the surface of the rod; the rows within the images having summed brightness values below a predetermined brightness threshold are selected as containing cavities of the code. The brightness threshold is selected based on the average local brightness in the non-encoded surface of the rod in the center of the field of view. The brightness threshold may vary depending on the material or surface coating on the rod; chrome for example is more reflective than bare steel. Image processing such as cross-correlation for example may be used to positively locate the cavities forming the delimiting elements within each row.

Once delimiting elements 210 are detected, the images are cropped using small squares to form boxes 230 around each expected position of a cavity relative to a detected delimiting element, i.e. each bit position, i.e., in the images (see FIG. 5). Each box 230 comprises a set of pixels used to determine absence or presence of a cavity within of each box, i.e. the value 0 or 1 of each bit.

In the presently discussed optical detection embodiment, the value of a bit is thus determined based on shape and brightness. The set of pixels contained within each box is assessed to determine whether they form a dark circular shape centered within the box, i.e. the expected appearance of a cavity. The brightness is determined by summing the brightness values of all pixels in each box and comparing with a brightness threshold. The combination of strong shape correlation and summed brightness below the brightness threshold as applied to the pixels in each box 230 positively is used to identify a cavity and the corresponding bit value is set to 1, while the combination of low shape correlation and summed brightness above the brightness threshold is translated as absence of a cavity setting the bit value to 0. Filtering and enhancing may be applied to discriminate between encoding cavities from unrelated artifacts surface such as surface scratches for example.

The identified bit values are regrouped into bytes to reconstruct the information elements visible within the field of view of the camera. These information elements are translated to integer values, each unique information element being associated with a unique integer value n, where N is the total number of unique information elements marked on the rod. The table comprising each unique integer from the code, i.e. each unique information element marked on the rod during encoding, associated with a corresponding unique absolute position predetermined during the code marking as discussed hereabove, is used to obtain the unique integers and the associated absolute position values. For example, in FIG. 5, the information element n is associated with the position x, and the information element n+1 is associated with the position x+Δx, Δx being the distance between two distinct consecutive information elements 220a and 220b marked on the rod.

The coarse absolute position of the piston rod thus obtained is then refined using the delimiting elements detected in the image.

For example, in FIG. 5, from the coarse position value, a fine position value is obtained by locating a transition line 240 between positions n and n+1 within the pixel array of the sensor (S), and applying a corresponding fine offset equal to the axial distance between the transition line and an arbitrary point within the pixel array of the sensor (S), for example the center of the pixel array of the camera detector, the coarse position value. The fine offset is positive or negative, depending on whether the transition line lies to the left or to the right of the pixel array center. The fine offset is added to the coarse position to yield the fine position. In case the transition line appears exactly in the middle of the pixel array of the camera detector, the fine offset value is zero and the coarse position is the fine position. For example, in a case where information elements associated to integers 3 and 4 are detected in a captured image, the absolute position is known to be between 3 and 4; the transition line lies between the numbers 3 and 4, to the left of the center of the image or to the right or directly in the center; the position measurement is refined to yield the fine position, i.e. the value between 3 and 4, of 3.37 for example. The inherent accuracy of the fine position value is equal to the width of one pixel on the detector of the camera, for example 4 microns.

Figure 6A:
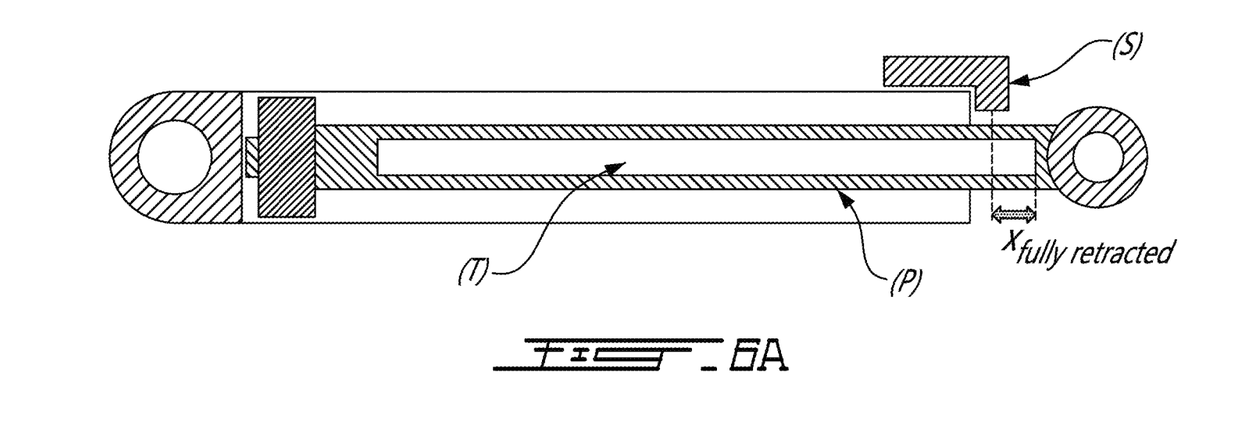
FIG. 6A shows a calibration step according to an embodiment of an aspect of the present disclosure.
Figure 6B:
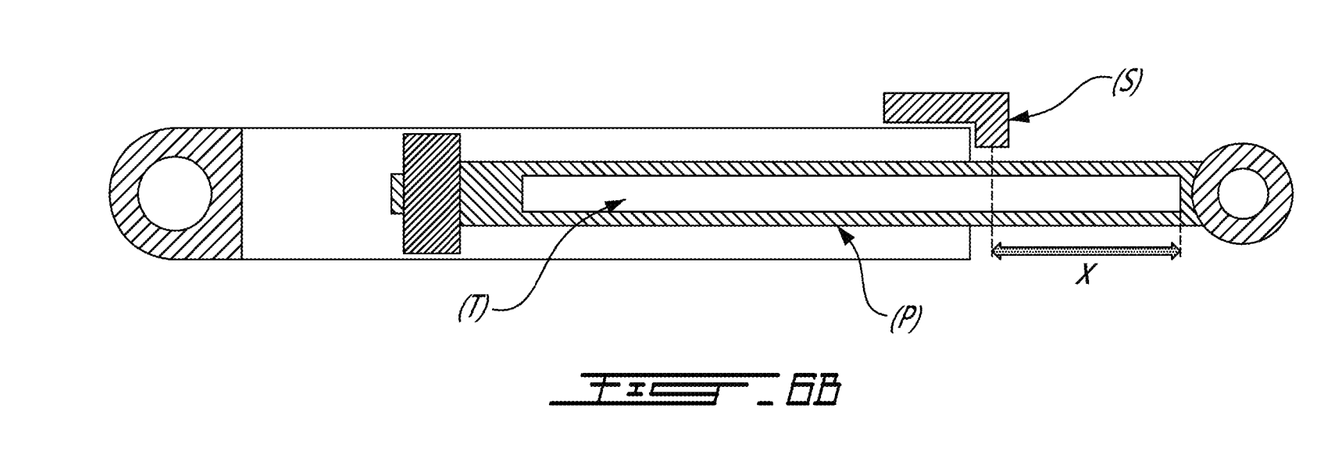
FIG. 6B shows a calibration step according to an embodiment of an aspect of the present disclosure.

A final offset corresponding to a position value generated during a calibration step is then applied to the fine position value to obtain the true absolute position of the piston rod. This final offset. During the calibration step, the absolute position returned when the rod of the cylinder is in its fully retracted position is recorded as the final offset $x_{fully\ retracted}$ (see FIG. 6).

The final offset is subtracted from each fine position value subsequently returned by the method to obtain the absolute position x of the piston rod. Referring to the previous example where information elements associated to the integers 3 and 4 are detected in the captured image, applying a final offset $x_{fully\ retracted}$ of 1.37 inches determined during calibration on the fine position 3.37 inches, yields the final absolute position of 2 inches, meaning that the rod is extended by 2 inches.

The magnification factor of the collecting optics 118 is used to compensate for a scaling factor between a mark on the rod surface and the image of this mark on the detector of the camera. The associated physical true length on the rod is obtained by counting the number of pixels in the image, multiplying by the known pixel size of the detector of the camera, and scaling the result correspondingly with the magnification factor.

The position of the code markings on the rod may be started anywhere along the longitudinal axis of the rod, provided the code is visible by the sensor (S) and sufficient unique information elements available to encode the useful motion range of the rod, referred to as the stroke length of the rod.

One line of cavities forming the code may be sufficient to decode the position information of the full stroke length of the rod. As previously mentioned, longitudinal redundancies may be used for detection of information elements. For example, referring to FIG. 5, two consecutive and distinct information elements 220a and 220b separated by the length Δx along the longitudinal axis of the rod and at least one duplicate of a the bytes of information element 220a within this separating length Δx may be used to increase the robustness of the decoding and prevent loss of position information in the event the surface of the rod is damaged during operation for example.

Figure 8:
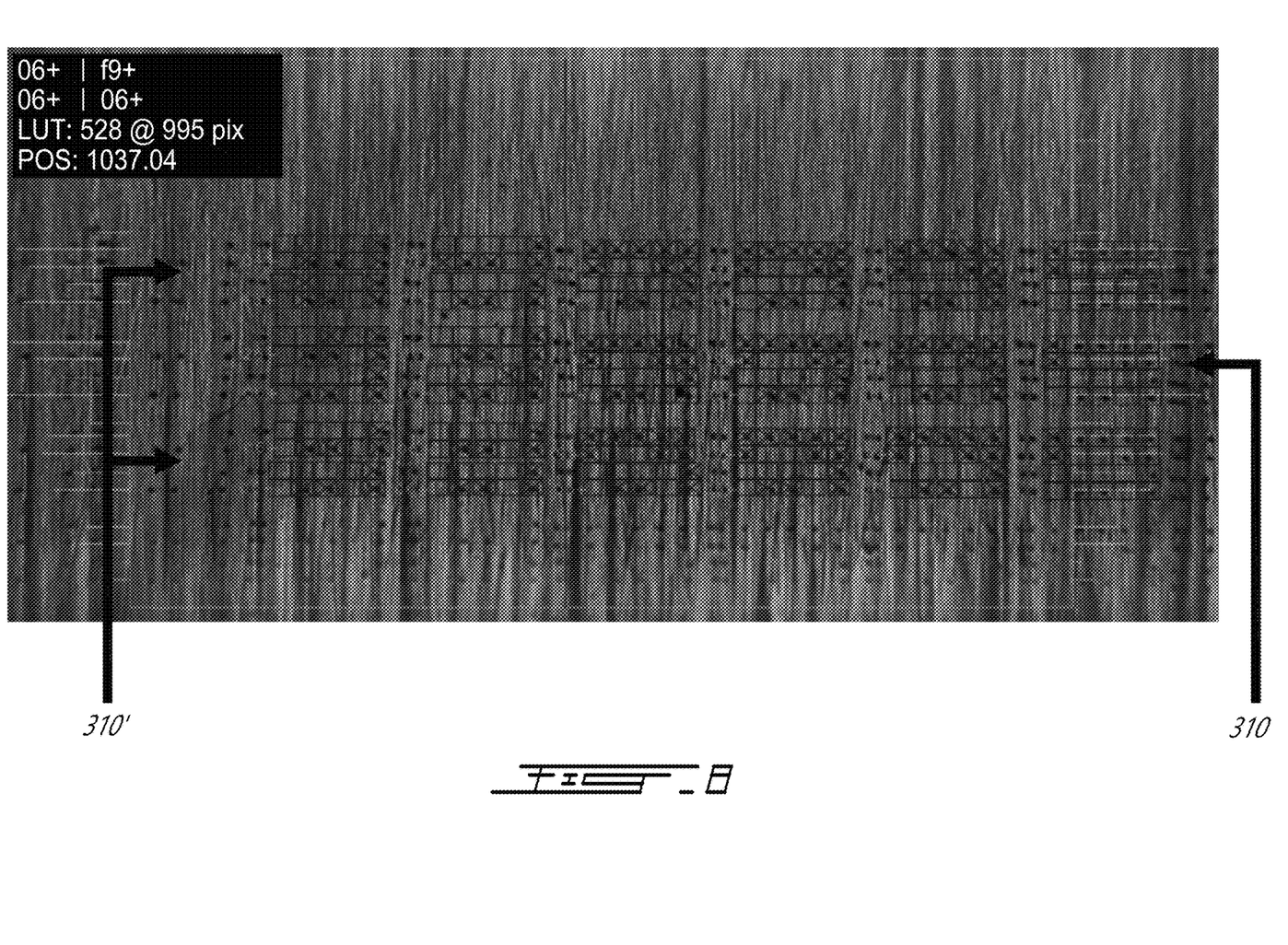
FIG. 8 shows a rod during experiments according to an embodiment of an aspect of the present disclosure.

Circumferential redundancy may also be used, as shown in FIG. 8, for ensuring that the code remains within the field of view of the camera upon rotation of the rod about its longitudinal axis. The angular interval of the circumferential redundancy is selected in such a way that at least one complete line of code remains at focus within the field of view of the camera upon rotation of the rod. For example, in FIGS. 8 and 9, the main code line 310 lies in the center of the field of view, while the code lines 310' above and below are redundancies in the event the rod rotates about its axis.

Experiments were performed with rods of a diameter of 1 inch and 3 inches, having a stroke between 0.5 m and 1.5 m, and a maximum linear speed of 0.5 m/s, considering a clocking, i.e. a rotation of the rod about its longitudinal axis, of +/−5 degrees (see FIG. 5).

In a first experiment, a chrome plated rod of a diameter of 1 inch was encoded along its entire length. The rod was mounted onto a linear translation table and put into motion. The translation table was equipped with a position feedback detector. The output of a sensor (S) according to an embodiment of the present disclosure was compared to the output of the position feedback detector of the translation table, and the maximal deviation was recorded for various travel speeds. For micro displacements, i.e. position increments of 10 microns, the maximum error between the two measurements was 8 microns. For larger displacements, i.e. position increments of several thousands of microns, the maximum error between the two measurements was 47 microns.

In a second experiment, the impact of defocalisation was investigated by intentionally putting the collecting optics 118 out of focus. The system was able to function with a defocalisation in the range between −150 microns and +150 microns. The defocalisation admissible was found to vary with the thickness of the oil film present on the rod.

In a third experiment, the effect of misalignment between the encoded pattern and the sensor (S) was investigated. The images were captured on a dry chrome plated rod, with an integration time of 25 microseconds and the illuminating LED light intensity was set at about 90%. The camera was rotated with increments of about 0.5 degree at a time. The system was found to function well with a misalignment in the range between −1.5 and +1.0 degree of rotation.

In a fourth experiment, the effect of the rod movement speed was investigated. The integration time and light intensity were the same as previously described. The rod movement speed was tested at values of 0, 200, 300, 400 and 500 mm/s and random images were captured for each speed. The system was found to perform without problems up to a speed of 500 mm/s. The images remained clear; as a result of the short integration time, and the cavities only moved about half their diameter during the time the image was captured.

In a fifth experiment, a rod with a diamond-like-carbon coating and a pattern encoded along its entire length was tested. The contrast was found to be inferior to that with the chrome plated rod. The integration time required to capture light was found to be double that of the chrome plated rod. Nonetheless the system was able to extract position measurement successfully.

In another set of experiments, a full-size hydraulic cylinder with a rod diameter of 3 inches and a stroke of 40 inches was tested. The rod had a diamond-like-carbon coating and was encoded across its entire length. The hydraulic cylinder was mounted onto a steel frame. Its tube-end attachment was maintained fixed while its rod-end attachment was allowed to move. A hydraulic power microstructure equipped with a directional valve was used to provide hydraulic oil to the cylinder. A sensor (S) according to an embodiment of the present disclosure was installed on the cylinder.

Figure 9:
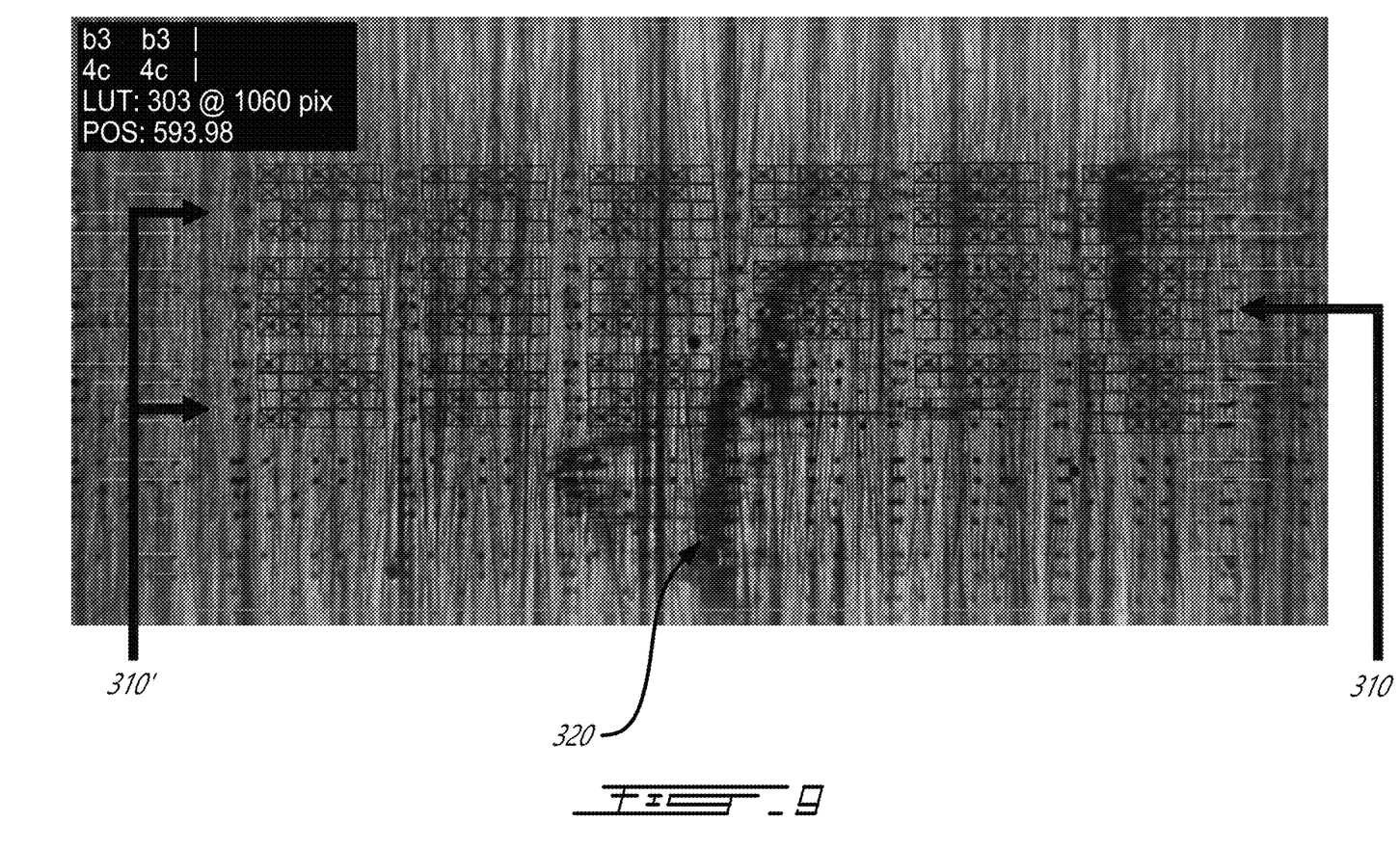
FIG. 9 shows a rod during experiments according to an embodiment of an aspect of the present disclosure.

The cylinder rod was put into motion and the sensor (S) captured images. A random rod position decoded is shown in FIG. 8. Using redundancies, the imperfect images where residues and oil films 320 were present on certain areas of the rod, as can be seen in FIG. 9, could be accurately decoded.

Then, the method was repeated ten times per second in order to measure the absolute position of the rod in real time during motion. Starting with the cylinder rod completely extended, the rod was completely retracted over a period of time. During that time, the sensor (S) captured about 2000 images, and the absolute position was accurately returned up to 99.5% of time. When the images were of subpar quality, with oil films and residues smeared on the code, the correct position was accurately returned up 83.1% of the time, showing that the method is able to perform in real time.

Permanently forming the encoded pattern on the surface of the rod by ablation of matter allows that although the rod may wear out, the encoded pattern remains and is visible in spite of other pattern elements that may occur of the surface of the piston rod, such as scratches, lines, etc. Moreover, the geometry of the cavities is selected depending on a target precision of the encoding of the position of the rod.

In forming the code, geometrical properties, such as the cavity diameter and the spacing between cavities, are selected to generate sufficient information density, i.e. a target amount of marked information per microstructure length/angle so as to ensure that the sensor (S) never encounters zones where the position cannot be known due to lack of information.

Similarly, the code is formed with a sufficiently high number of bits per byte to be able to mark unique and distinct information elements across the total useful dimension of the part to be positioned, for example along the length of the rod of a cylinder as described hereinabove.

Although the method was described hereinabove in relation to a linear actuator, the method may be applied to a range of mechanical systems. For example for determining the angular position of motor shafts, the code is formed circumferentially on the surface of the shaft.

Although the method was described with the code marked on a moving part of a system, the code may be marked on a fixed part of the system and the sensor (S) positioned in relation to the moving part in such a way as to detect the encoded surface. For example, in the case of a hydraulic cylinder, in a case where the cylinder rod is fixed, and the barrel (B) is moving, the sensor (S) may be positioned in relation to the moving barrel (B) so as to be able to detect the encoded surface of the barrel (B).

Although the method described hereinabove was based on optical detection and analysis, a range of detection methods allowing a 2D signal map may be selected. For example, the microstructures formed on the moving part under study may be filled with a magnetic material and the microstructures detected using an electromagnetic detector or empty microstructures may be detected using an ultrasonic emitter and receiver device. The microstructures formed on the moving part under study may be selected with properties different from that of the surface of the encoded part.

The method comprises forming a code on the surface of one of: i) the first part and ii) the second part in a system, the first part moving in relation to the second part, the code being microstructures of selected geometry formed at precise positions on the surface of the encoded part; detecting and identifying the code using a sensor observing the code clearly and legibly, i.e. in conditions selected so that the code is readable by the sensor in relation to the rest of the surface of the encoded part; decoding the code thus clearly detected on the surface finish of the encoded surface, even in presence of surface defects for example, using redundancy if needed, and obtaining positions of the moving part, a coarse position, a precise and a final position, as needed.

There is thus provided a system and a method for measuring the absolute position of a moving part of a system, comprising integrating a permanent code on the surface of the moving part. The code is formed by microstructures of a shape selected according to a target precision of the determination of the position and/or a target useful lifetime of the system. The code may integrate a number of redundancy elements.

The scope of the claims should not be limited by the embodiments set forth in the examples, but should be given the broadest interpretation consistent with the description as a whole.

The invention claimed is:

1. A method for determining a position of a first part moving in relation to a second part in a system, comprising:
    forming a code on a surface of one of: i) the first part and ii) the second part; yielding an encoded surface;
    detecting the code on the encoded surface;
    decoding the code; and
    determining the position of the moving part from said decoding of the code;
    wherein:
    said forming the code comprises forming microstructures at precisely selected positions on the encoded surface; and said detecting the code comprises scanning the encoded surface with a sensor in conditions selected in relation to the code formed on the encoded surface and the encoded surface, the sensor being selected in relation to the code formed on the encoded surface and the encoded surface.

2. The method of claim 1, wherein the microstructures form binary information representing a unique absolute position of the moving part within a sequence of absolute positions marked on the encoded surface; said detecting the code comprising identifying the binary information; said decoding comprising translating the binary information to an associated first position value of the moving part.

3. The method of claim 1, wherein the microstructures form binary information representing i) a unique absolute position of the moving part within a sequence of absolute positions marked on the encoded surface and ii) redundancy of unique absolute position of the moving part; said detecting the code comprising identifying the binary information; said decoding comprising translating the binary information to an associated first position value of the moving part.

4. The method of claim 1, wherein the microstructures form information elements separated by delimiting elements, each information element forming binary information representing a unique absolute position of the moving part within a sequence of absolute positions marked on the encoded surface; said detecting the code comprising identifying the information elements; said decoding comprising:
translating each information element to an associated first position value of the moving part; and
refining the first position by using the delimiting elements and applying offsets to the first position.

5. The method of claim 1, wherein said detecting the code comprising taking images of the encoded surface, locating the microstructures in the images by summing a brightness values of each row of pixels in the images, selecting rows of pixels having a summed brightness value below a predetermined brightness threshold as containing microstructures; and wherein the microstructures form information elements separated by delimiting elements, each information element forming binary information representing a unique absolute position of the moving part within a sequence of absolute positions marked on the encoded surface; said detecting the code comprising identifying the information elements; said decoding comprising:
translating each information element to an associated first position value of the moving part; and
using the delimiting elements and applying offsets to the first position; yielding a second position.

6. The method of claim 1, wherein said detecting the code comprising taking images of the encoded surface, locating the microstructures in the images by summing a brightness values of each row of pixels in the images, selecting rows of pixels having a summed brightness value below a predetermined brightness threshold as containing microstructures; and wherein the microstructures form information elements separated by delimiting elements, each information element forming binary information representing a unique absolute position of the moving part within a sequence of absolute positions marked on the encoded surface; said detecting the code comprising identifying the information elements; said decoding comprising:
translating each information element to an associated first position value of the moving part; and
using the delimiting elements and applying offsets to the first position; yielding a second position, said detecting the code comprising taking images of the encoded surface, locating the microstructures in the images by summing a brightness values of each row of pixels in the images, selecting rows of pixels having a summed brightness value below a predetermined brightness threshold as containing microstructures;
wherein the brightness threshold is selected based on an average local brightness in a non-encoded part of the encoded surface.

7. The method of claim 1, comprising selecting a geometry of the microstructures and forming the microstructures along at least one of: i) a longitudinal axis of the part and ii) a circumferential axis of the part.

8. The method of claim 1, comprising forming separate microstructures along at least one of: i) a longitudinal axis of the part and ii) a circumferential axis of the part.

9. The method of claim 1, comprising forming microstructures continuously along at least one of: i) a longitudinal axis of the part and ii) a circumferential axis of the part.

10. The method of claim 1, wherein the microstructures have properties different than properties of the surface of the part on which the code is formed.

11. A method for determining a position of a piston rod reciprocating within a barrel of a linear actuator, comprising:
forming a code on a surface of the piston rod; yielding an encoded surface;
detecting the code on the encoded surface;
decoding the code; and
determining the position of the piston rod from said decoding of the code;
wherein:
said forming the code comprises forming microstructures at precisely selected positions on the surface of the piston rod;
said detecting the code comprises selecting an optical sensor and acquiring images of the surface of the piston rod using the sensor;
said decoding comprises detecting microstructures on the images and one of: i) determining a first position of the piston rod from said detecting of the microstructures on the images; ii) determining a first position of the piston rod from said detecting of the microstructures on the images and applying a first offset to the first position to obtain a second position from said detecting of the microstructures on the images; and ii) determining a first position of the piston rod from said detecting of the microstructures on the images; applying a first offset to the first position to obtain a second position from said detecting of the microstructures on the images; and applying a second offset to the second position to obtain a third position from said detecting of the microstructures on the images; the second offset being determined when the piston is in a fully retracted position.

12. The method of claim 11, wherein the microstructures are microcavities formed on a coating of the surface of the piston rod.

13. The method of claim 11, wherein the microstructures are microcavities of selected size and depth.

14. The method of claim 11, wherein the microstructures are microcavities, the method comprising selecting a camera, illuminating optics and collecting optical of the optical sensor according to the code, the encoded surface and a distance between the camera and the piston rod.

15. The method of claim 11, wherein the code formed on the surface of the piston rod is a permanent code.

16. The method of claim 11, wherein the microstructures are of a selected geometry along at least one of: i) a longitudinal axis of the piston rod and ii) a circumferential axis of the piston rod.

17. The method of claim 11, wherein the microstructures are separate microstructures.

18. The method of claim 11, wherein said detecting the code comprises illuminating the surface of the piston rod and scanning the encoded surface with an optical sensor positioned at a distance from the piston rod selected to bring the surface of the piston rod into focus of a camera of the sensor and taking images of the encoded surface.

19. The method of claim 11, wherein the cavities are filled with a material different than a material of the surface of the rod.

20. The method of claim 11, wherein said detecting the code comprises using at least one of: visible light, non-visible light; and polarized light.

* * * * *